United States Patent [19]
Yuzawa et al.

[11] Patent Number: 5,763,843
[45] Date of Patent: Jun. 9, 1998

[54] DEVICE AND METHOD FOR ELECTRICAL DISCHARGE MACHINING

[75] Inventors: Takashi Yuzawa; Manabu Yoshida; Takuji Magara, all of Tokyo, Japan

[73] Assignee: Mitsubishi Denki Kabushiki Kaisha, Tokyo, Japan

[21] Appl. No.: 833,062

[22] Filed: Apr. 3, 1997

[30] Foreign Application Priority Data

Jun. 19, 1996 [JP] Japan ................................ 8-158280

[51] Int. Cl.⁶ .......................... B23H 1/00; B23H 7/20
[52] U.S. Cl. ........................ 219/69.13; 219/69.16; 219/69.17
[58] Field of Search ................... 219/69.17, 69.13, 219/69.16, 69.2; 364/474.04

[56] References Cited

U.S. PATENT DOCUMENTS

| 3,591,761 | 7/1971 | Bederman et al. | 219/69.13 |
| 4,431,897 | 2/1984 | Ito | 219/69.16 |
| 4,608,476 | 8/1986 | Shimizu | 219/69.16 |
| 5,354,961 | 10/1994 | Diot et al. | 219/69.13 |
| 5,418,344 | 5/1995 | Magara et al. | 219/69.17 |

FOREIGN PATENT DOCUMENTS

| 639420 | 8/1994 | European Pat. Off. |
| 639421 | 8/1994 | European Pat. Off. |
| 41-3594 | 3/1941 | Japan |
| 1-22097 | 4/1989 | Japan |

*Primary Examiner*—Geoffrey S. Evans
*Attorney, Agent, or Firm*—Sughrue, Mion, Zinn, Macpeak & Seas, PLLC

[57] ABSTRACT

The electrical discharge machining device includes storage apparatus for storing the two-dimensional contour pass of the machined shape formed by the primary machining operation, the dimension of the taper of the side surface of the workpiece to be machined, the amounts of feed of the electrode in a given Z direction with respect to the movements of the electrode in the X and Y direction under respective machining conditions; information adding apparatus for adding offset information to the above-mentioned contour pass; machining operation number calculating apparatus, in accordance with a previously obtained machining depth per round about an electrode pass, for calculating the number of machining operations to be repeatedly executed around the electrode pass until a target depth is obtained; offset displacement amount calculating apparatus for calculating an offset displacement amount per round about the electrode pass in accordance with the length in the above-mentioned side surface direction of the side surface taper dimensions and the number of repeated machining operations; and, electrode position control apparatus, in accordance with an offset position added to the contour pass by the offset information adding apparatus, for controlling the offset displacement amount each time the electrode pass is machined.

7 Claims, 12 Drawing Sheets

SIDE SURFACE TAPER MACHINING

SET DIMENSION

FIG. 9B

ACTUALLY MACHINED DIMENSION b2 = b1 × B/b

SURFACE A

DEVICE AND METHOD FOR ELECTRICAL DISCHARGE MACHINING

BACKGROUND OF THE INVENTION

The present invention relates to an electrical discharge machining device and an electrical discharge machining method in which, after the side surface of a workpiece is previously machined in the vertical direction, the thus vertically machined side surface is machined into a tapered shape using a hollow cylindrical electrode.

Conventionally, in general, when the side surface of a workpiece is machined into a tapered shape by use of electrical discharge machining, the side surface of an electrode is formed into a tapered shape and the electrode is then advanced and retreated only in a main direction axis with respect to the workpiece to thereby transfer the tapered shape of the electrode to the workpiece.

On the other hand, as disclosed in the Examined Japanese Patent Application Publication No. Sho. 41-3594, there are widely used electrical discharge machining method and device in which a bar electrode is moved with respect to a workpiece in a direction at right angles to a main direction (that is, in a perpendicular plane).

Figure 13:
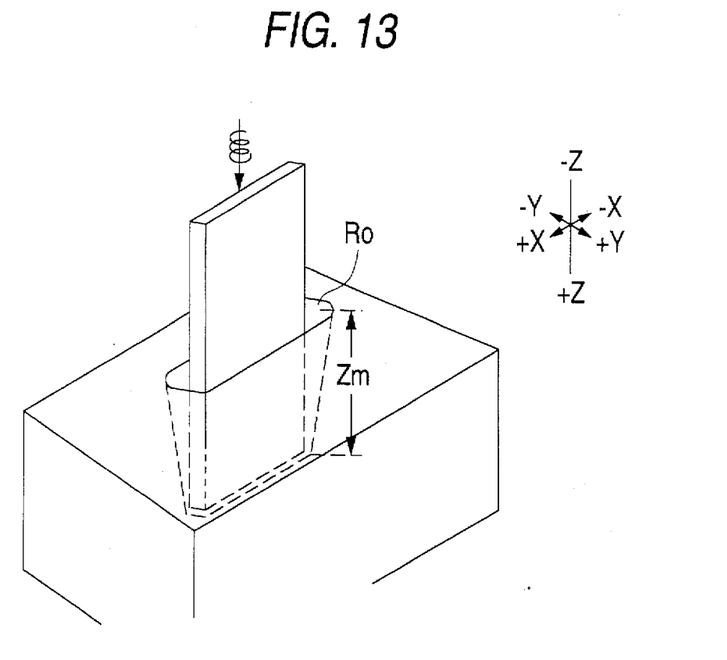
FIG. 13 is a view of a conventional electrical discharge machining method for producing a taper shape using a bar electrode.

In this case, by controlling the amount of displacement of such a bar electrode (straight electrode) as shown in FIG. 13 in accordance with the machining depth in such a manner that the displacement amount is large when the electrical discharge machining is started and is decreased as the electrical discharge machining progresses, it is possible to machine the workpiece in such a manner that it has a taper shape having a machining depth of Zm and a radius RO (the amount of movement of the electrode in a direction at right angles to the advance and retreat direction thereof at the starting time of the machining. In particular, the electrode is moved not only in the Z-axis direction, which is the advance and retreat direction of the electrode, but also in the X-axis and Y-axis directions which are at right angles to the Z-axis direction. That is, the above-mentioned taper shape machining operation is executed by combining the movements of the electrode in the three axes directions. Also, the combination of the electrode movements in the X-axis and Y-axis directions makes it possible to move the electrode about the Z axis for the taper shape machining operation.

Figure 14A:
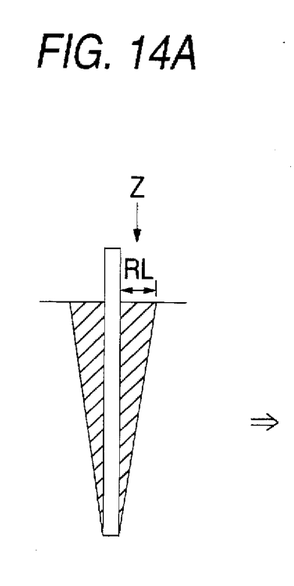
FIGS. 14A to 14C are views of a machining process executed when a taper shape is generated using a bar electrode while using the side surface of the electrode effectively.
Figure 14B:
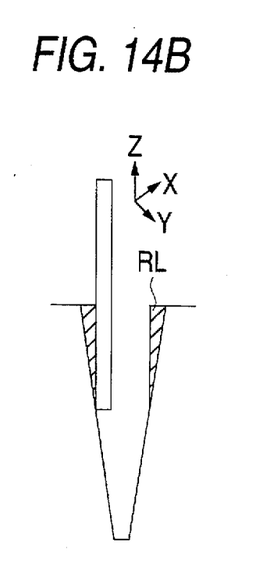
Figure 14C:
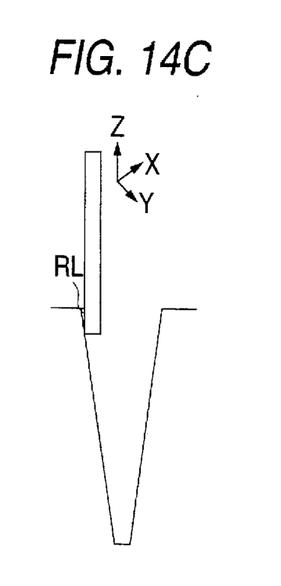

Also, in a method which is disclosed in the Examined Japanese Patent Application Publication No. Hei. 1-22097, there is proposed a method in which, as shown in FIG. 14A, an electrode is advanced in the Z-axis direction to thereby machine a workpiece and next, as shown in FIGS. 14B and 14C, while the electrode is being retreated from the machining finished position, it is moved in the X-axis and Y-axis directions to thereby allow the side surface portions of the electrode to machine the remaining portions of the previously machined workpiece portion. If this machining method is used, then the machining can be executed in such a manner that electric discharge is not concentrated on the leading end portion of the electrode.

On the other hand, conventionally, there is known an electrical discharge machining device which uses an electrode having a simple shape such as a tubular shape, a cylindrical shape, a prismatic shape or the like, and executes three-dimensional control by use of NC control means, thereby being able to machine a workpiece into a desired three-dimensional shape. In such electrical discharge machining device, since it is not necessary to manufacture a complicated three-dimensionally-shaped compound die, the manufacturing cost and time of a metal mold can be improved. Also, because the electrode used for machining has a specific simple shape, it is easy to build a CAM system and the automation of the machining process can also be expected.

However, in this type of electrical discharge machining device, since the electrode having a simple shape is used to machine the wide area of the workpiece, when compared with the electrical discharge machining using the compound die electrode, the amount of wear of the electrode is increased and the precision of the machined shape is lowered. In order to solve these problems, in the Examined Japanese Patent Application Publication No. Hei. 5-345228, there is disclosed a method which is capable of machining a workpiece into a desired shape with high precision by correcting the amount of wear of an electrode used. FIG. 15 shows the principle of the electrode wear amount correction method employed in the present method.

As shown in FIG. 15, if a rotating cylindrical electrode is fed obliquely at an angle of $\alpha$ with respect to a plane which is currently being machined by electrical discharge, then it is possible to generate not only a transitional state including a position (a) to a position (d) in which the contour shape and machining depth of the electrode 1 are caused to vary, but also a constant state including the positions (d), (e) and its following positions in which the contour shape and machining depth of the electrode 1 remain constant. In this case, if the machining is executed under the condition that the electrode wear amount is large, then the above-mentioned transitional state from the position (a) to the position (d) can be almost ignored. Therefore, by feeding the machining electrode obliquely at a proper angle of $\alpha$, the workpiece can be machined properly, that is, a layer-shaped portion can be removed from the workpiece with a constant machining depth.

In a technology using this method, there is included a simulator which is used to calculate a value for correcting the wear amount of the electrode in the longitudinal direction thereof, that is, if the thickness E of the removal layer, electrode radius R and volume wear ratio U are given, then the simulator calculates the feed angle $\alpha$ of the electrode with respect to the plane of the layer being machined by electrical discharge, the workpiece is electrical discharge machined by means of the inclining motion of the electrode.

Figure 16A:
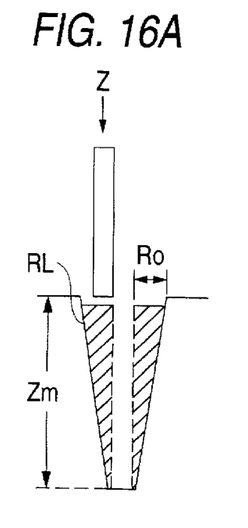
FIGS. 16A to 16C are machining process views of the electrical discharge machining method shown in FIG. 13 when a taper shape is produced using a bar electrode; and, FIGS. 17A and 17B are explanatory views of a sample of a shape to be machined.

In the above-mentioned electrical discharge machining device which is shown in FIG. 13 and is capable of machining a workpiece into a tapered shape, in the machining operation thereof, as shown in FIG. 16A, it is always the leading end portion of the electrode that is opposed to the workpiece. Due to this, the electrode leading end portion is always affected by electric discharge or electrolysis and is thus easy to wear. When the electrode leading end portion is worn, as shown in FIGS. 13B and 13C, it varies in shape, so that there are left unmachined or unshaved portions which are shown as shaded portions. As a result of this, the actually machined shape of the workpiece is greatly different from the target or expected machined shape.

Figure 16B:
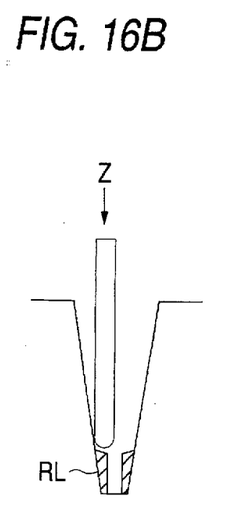
Figure 16C:
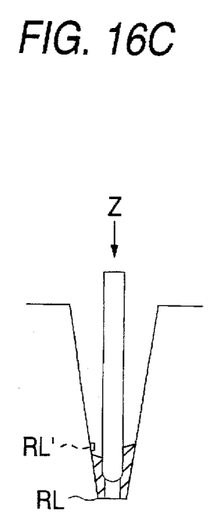

On the other hand, in such machining as shown in FIG. 14, not only the leading end portion of the electrode but also the side surface of the electrode are used effectively to thereby be able to restrict the concentrated wear of the leading end portion of the electrode, which allows the machining to be executed while maintaining the shape of the electrode in a better condition than that shown in FIG. 16. However, referring to the bar electrode to be used in this machining operation, it is necessary to previously prepare another electrode which is almost identical in the two-dimensional machining shape with the bar electrode originally used, even when it has a vertical side surface.

Figure 17A:
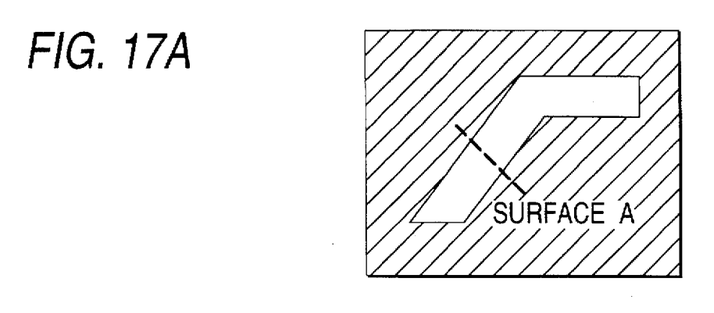
Figure 17B:
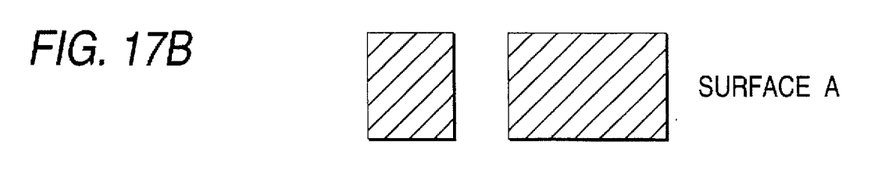

For example, as shown in FIG. 17, when a slit-like opening is machined previously by a pre-machining operation and the slit or opening is then machined into a tapered shape, it is quite inefficient to manufacture a compound die electrode having a complicated shape. In such case as shown in FIG. 17, of course, the slit can be machined not only with higher precision but also in a shorter time by use of a wire-cut electrical discharge machining device when compared with the device using the complicated compound die electrode. Therefore, even if a bar electrode having a slit shape is manufactured, it is only the taper portion of the slit that can be machined by such bar electrode having a slit shape.

Also, when a workpiece formed of material having a high hardness is used, the side surface of the electrode wears in such an amount that cannot be neglected. For this reason, during the machining operation, it is necessary that a plurality of electrodes are replaced in order to thereby eliminate the effects of the considerable wear of the electrodes.

On the other hand, description will be given below of a case in which a contour machining operation is executed using an electrode having a simple shape. At first, when a taper machining operation is carried out under a low-wear condition where the electrode is not caused to wear as much as possible, the machining operation is executed by the edge portion of the end face of the electrode, so that the end face edge wears heavily. Specifically, since the only the edge portion of the electrode end face wears into a rounded shape, in order to maintain the precision of the electrode end face shape, it is necessary to dress the end face portion of the electrode or to replace the electrode itself frequently.

As disclosed in the above-mentioned the Examined Japanese Patent Application Publication No. Hei. 5-345228, in the method for machining a workpiece while correcting the wear of the electrode, the machining is basically executed on condition that the side surface shape to be machined is vertical, with no attention paid to high-precision taper machining. Also, because such machining method is used on condition that a blank or unmachined workpiece is to be machined, according to this method, it is difficult to taper machine the side surface of the workpiece that has been previously machined, for example, such workpiece as shown in FIG. 17.

SUMMARY OF THE INVENTION

The present invention aims at eliminating the abovementioned drawbacks found in the conventional electrical discharge devices and methods. Accordingly, it is an object of the invention to provide electrical discharge device and method in which, after the side surface of a workpiece is previously machined vertically, the vertically machined side surface of the workpiece can be machined into a tapered shape by use of a hollow cylindrical electrode with high precision.

In attaining the above object, according to the invention, there is provided an electrical discharge machining device for applying a pulse voltage between an electrode and a workpiece, and executing a three-dimensional control operation by means of NC control means to thereby carry out desired shape machining, the electrical discharge machining device comprising: storage means, after a primary machining operation to form a slit in a workpiece is executed previously as a pre-machining operation, for storing the two-dimensional contour pass of the machined shape formed by the primary machining operation, the dimension of the taper of the each of the side surfaces of the workpiece to be machined, the amounts of feed of the workpiece in a given Z direction with respect to the movements of the electrode in the X and Y direction under respective machining conditions, and a machining condition table; information adding means for adding off-set information to the above-mentioned contour pass; machining operation repetition number calculating means, based on a machining depth per round about an electrode pass which has been previously obtained in accordance with not only data on the depth of the dimension of the slit side surface taper to be machined and the Z-direction feed amount of the workpiece but also an electrical condition for machining and the diameter of the electrode, for calculating the number of machining operations to be repeatedly executed on the electrode pass until a target depth is obtained; offset displacement amount calculating means for calculating an offset displacement amount per round about the electrode pass in accordance with not only the length of the dimension of the slit side surface taper in the side surface direction thereof and but also the number of machining operations to be executed; electrode position control means, in accordance with an offset position added to the contour pass by the offset information adding means, for controlling the offset displacement amount each time the electrode pass is machined; and, secondary machining means for machining each of the side surfaces of the workpiece slit into a tapered shape while rotating a hollow cylindrical electrode in a Z axis direction by the electrode position control means.

Also, according to the present electrical discharge machining device, the outside diameter of the hollow cylindrical electrode is equal to or larger than the length of the dimension of the side surface taper to be machined in the side surface direction thereof.

Further, according to the present electrical discharge machining device, the thickness of the hollow cylindrical electrode is equal to or smaller than the allowable value of the curvature of radius of a curved portion formed in the bottom portion of the side surface taper.

In attaining the above object, according to the invention, there is provided an electrical discharge machining method for applying a pulse voltage between an electrode and a workpiece, and executing a three-dimensional control operation by means of NC control means to thereby carry out desired shape machining, the electrical discharge machining method comprising the steps of: executing a primary machining operation on the workpiece to form a slit previously in the workpiece as a pre-machining operation; storing the secondary contour pass of the shape of the workpiece slit formed by the primary machining operation, the dimension of the taper to be machined of each of the side surfaces of the workpiece slit, the amounts of feed of the workpiece in a given Z direction with respect to the movements of the electrode in the X and Y direction under respective machining conditions, and a machining condition table; adding off-set information to the contour pass; calculating the number of machining operations to be repeatedly executed on the electrode pass until a target depth is obtained, based on a machining depth per round about an electrode pass which has been previously obtained in accordance with not only data on the depth of the dimension of the slit side surface taper to be machined and the Z-direction feed amount of the workpiece but also an electrical condition for machining and the diameter of the electrode; calculating an offset displacement amount per round about the electrode pass in accordance with not only the length of the dimension of the slit side surface taper in the side surface direction thereof and but also the number of machining operations to be executed; controlling the offset displacement amount each time the electrode pass is machined, in accordance with an offset position added to the contour pass by an offset information adding means; and, machining each of the side surfaces of the workpiece slit into a tapered shape while rotating a hollow cylindrical electrode in a Z axis direction.

Also, according to the present electrical discharge machining method, the step of calculating the number of repeated machining operations to be executed on the electrode pass is processed in accordance with a previously obtained machining depth per round the electrode pass, set depth data based on the side surface taper dimension, and previously obtained depth data.

Further, according to the present electrical discharge machining method, the outside diameter of the hollow cylindrical electrode is equal to or larger than the length in the side surface direction of the dimension of the side surface taper to be machined.

In addition, according to the present electrical discharge machining method, the thickness of the hollow cylindrical electrode is equal to or smaller than the allowable value of the radius of curvature of a curved portion to be formed in the bottom portion of the side surface taper.

DETAILED DESCRIPTION OF THE PREFERRED EMBODIMENTS

Now, description will be given below of the embodiments of the invention with reference to the accompanying drawings.

(EMBODIMENT 1)

Figure 1:
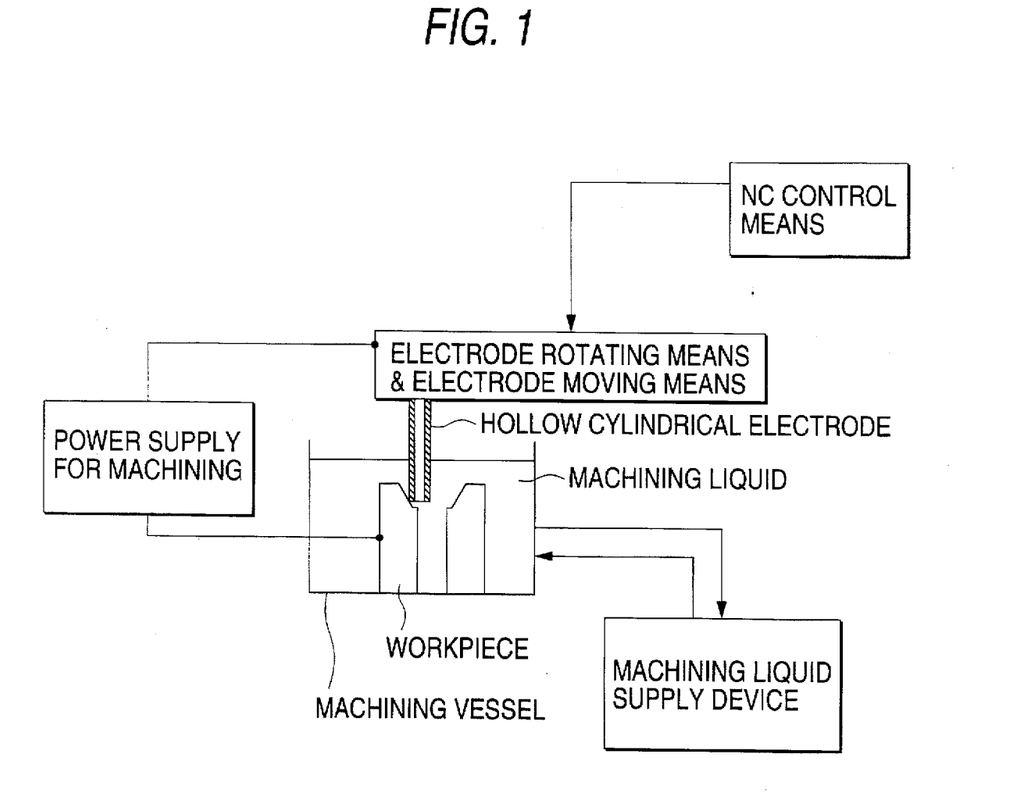
FIG. 1 is a block diagram of the schematic structure of an electric discharge machining device according to an embodiment 1 of the invention.

FIG. 1 is a schematic block diagram of the structure of an electric discharge machining device according to a first embodiment 1 of the invention.

In FIG. 1, reference character 1 designates a hollow cylindrical electrode which is used to machine, 2 a workpiece, 3 electrode moving means and electrode rotating means, 4 a machining liquid, and 5 a machining vessel. Also, 6 stands for machining liquid supply means which is used to circulate the machining liquid 4, while 7 designates a machining power supply which is used to apply a current pulse between the electrode 1 and workpiece 2. Further, 8 stands for NC control means which is used to move the electrode 1 in accordance with data on the shape to be machined.

Figure 2:
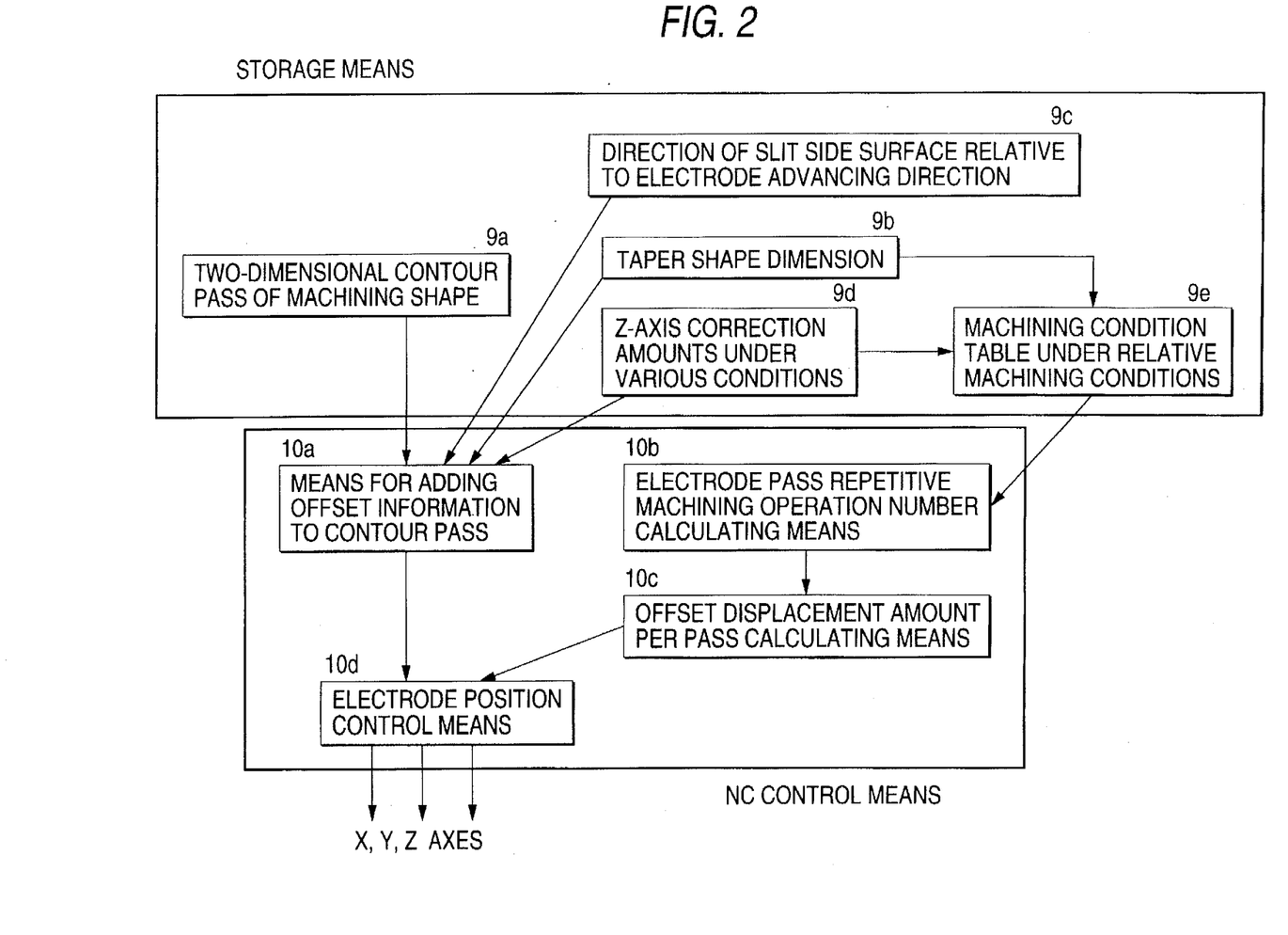
FIG. 2 is a detailed view of a flow of information up to the electrical discharge machining device shown in FIG. 1.

FIG. 2 is a detailed view of the flow of information up to the electrical discharge machining device shown in FIG. 1.

In FIG. 2, 9 designates storage means which comprises the two-dimensional contour pass 9a of a target shape to be machined, the dimension 9b of a side surface to be machined, the direction 9c of the side surface with respect to the advancing direction of the electrode 1, the feed amounts 9c of the electrode 1 in a given Z direction with respect to the movements of the electrode 1 in the X and Y directions under respective machining conditions, and a machining condition table 9e. Here, it can be considered that the parameters of 9d respectively correspond to Z direction correction amounts with respect to the wear of the electrode under the respective machining conditions (such as electrical conditions, electrode diameters and the like). Also, in the machining condition table 9e, a machining depth per round a contour machining pass is calculated according to the parameters of 9d. Now, 10 designates NC control means which comprises means (offset information adding means) 10a which is used to add offset information to the contour pass, pass repetition number calculating means (machining operation number calculating means) 10b, means (offset displacement amount calculating means) 10c which is used to calculate an offset displacement amount per pass according to an initial offset value, and electrode position control means 10d.

Figure 3A:
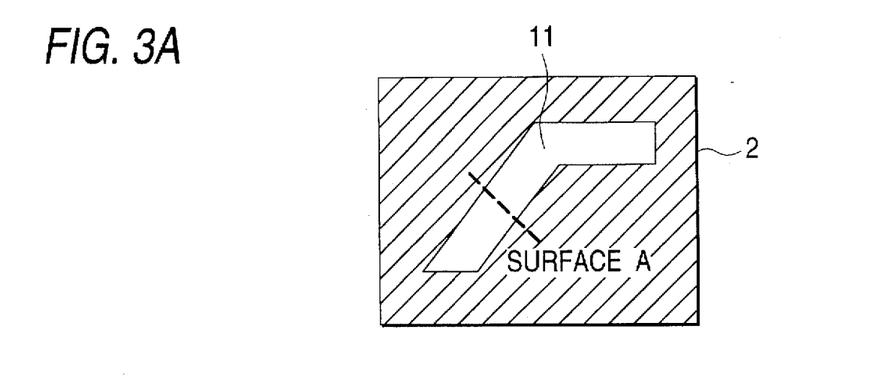
FIGS. 3A to 3C are explanatory views of a sample of a shape to be machined.

Next, description will be given below of a side surface machining process carried out by the present electrical discharge machining device using a simple pipe electrode. In the present machining process, as a primary machining operation, a slit is previously formed in a workpiece by a pre-machining operation. The thus machined shape is shown in FIG. 3A. The primary machining means may be the same as secondary machining means which is used to execute a taper machining operation to be described later, or may be an electrode of a different type.

Figure 3B:
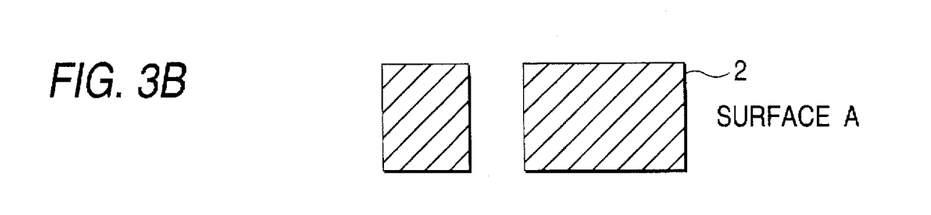
Figure 3C:
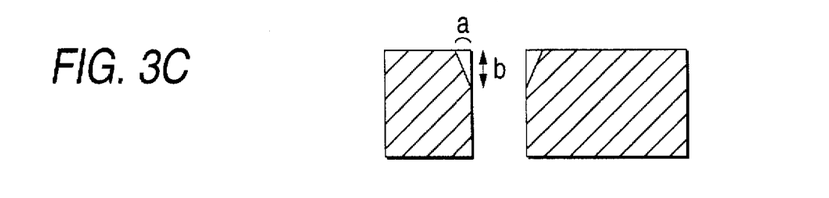

In the present embodiment, as an example of a taper machining operation, there is executed an operation to machine each of the side surfaces into such a taper shape as shown in FIG. 3B. The dimension of the taper is set such that it includes the maximum amount a in the side surface direction and the maximum amount b in the depth direction.

Figure 5A:
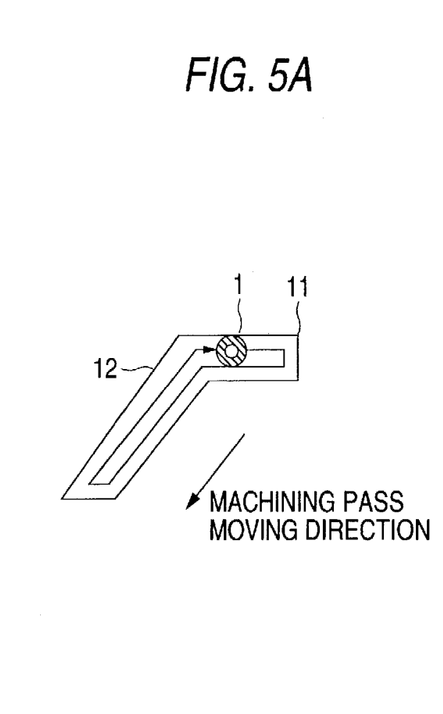
FIGS. 5A to 5C are explanatory views of an electrode movement pass when the side surface of a workpiece is taper machined in the electrical discharge machining device according to the embodiment 1 of the invention.
Figures 5B, 5C:
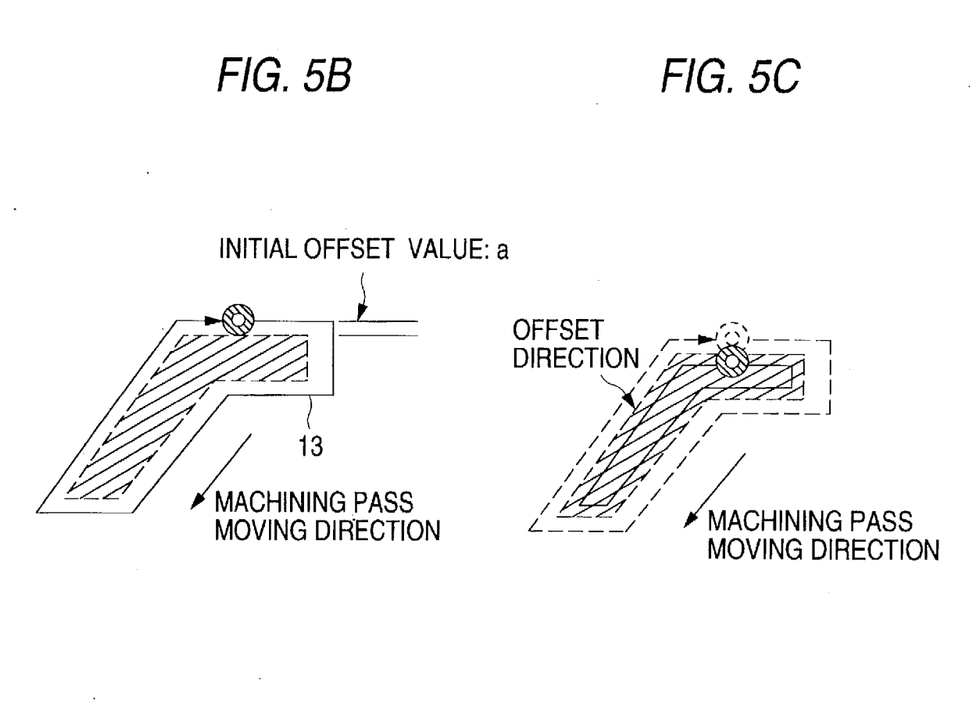

On the other hand, before the taper machining is executed, it is necessary to previously form an electrode contour pass with respect to the pond shape of the slit shown in FIG. 3A. The electrode contour pass, as shown in FIG. 5A, must be an electrode contour pass 12 which allows the side surface of an electrode used to come into contact with the inner side surface of a pond-shaped contour 11 of the slit. This electrode pass 12 provides a basic machining pass 12 which is used to execute the present taper machining operation. Here, since this machining pass corresponds to the offset information, specification for enlargement or reduction is possible in accordance with the specification of an offset value as shown in FIG. 5B.

Figure 4A:
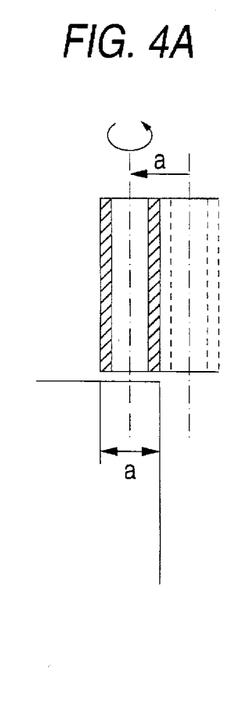
FIGS. 4A to 4D are process views of a side surface taper machining method for use in the electrical discharge machining device according to the embodiment 1 of the invention.

When viewed from the side surface direction, the process of the side surface taper machining can be shown in the order of FIGS. 4A, 4B, 4C, and 4D. Here, it is assumed that the electrode 1 used is a pipe electrode and, during machining, it is always rotating at a constant number of rotations. At first, the pipe electrode 1 having an outside diameter D, as shown in FIG. 4A, starts at a position which is enlarged by an offset amount a with respect to the previously given basic contour pass 12. When viewed from above, an electrode pass 13 at the machining start time is as shown in FIG. 5B.

Figure 6:
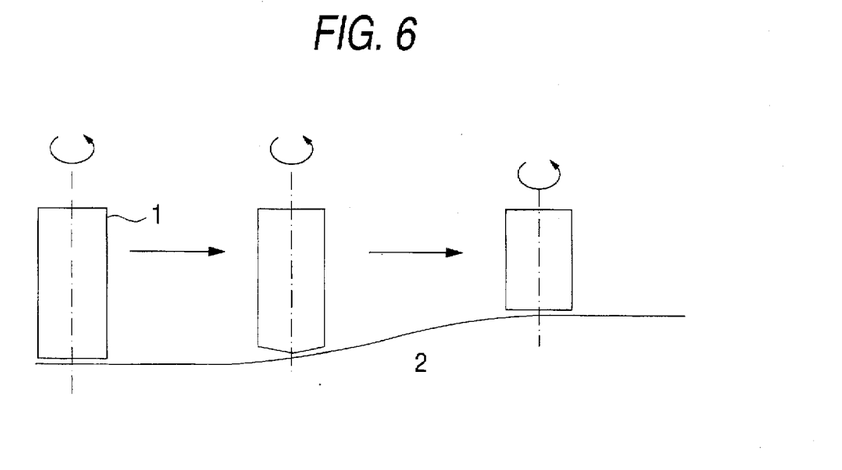
FIG. 6 is an explanatory view of a machined shape obtained when the electrode wear correction is not executed.
Figure 15A:
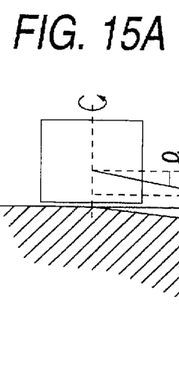
FIGS. 15A to 15E are explanatory views of a conventional electrical discharge machining operation to be executed by a simple electrode using an electrode wear correction control method.
Figure 15B:
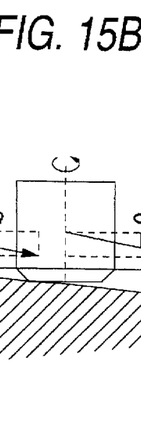
Figure 15C:
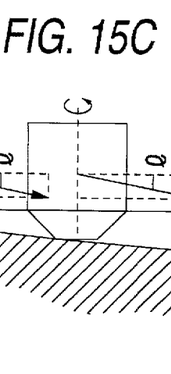
Figures 15D, 15E:
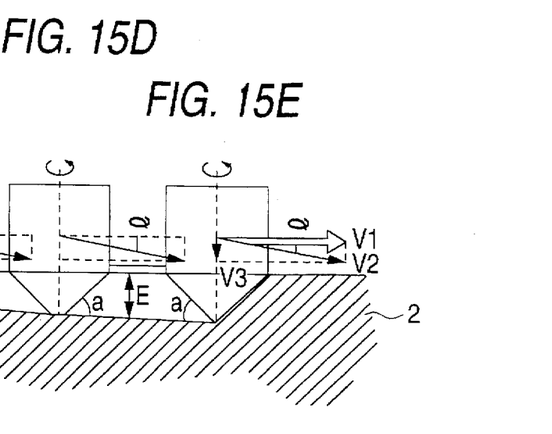

As described above, the first machining is executed on the electrode pass 13 enlarged by an offset amount a with respect to the previously given basic machining pass 12. However, if the electrode moves along the electrode pass 13, that is, only along the X/Y plane, then the electrode wears out before it makes a round of the machining pass and thus, as shown in FIG. 6, the machining is stopped halfway and cannot be executed any longer. For this reason, as shown in FIG. 15, the machining operation is carried out in such a manner that the electrode is being lowered in the Z direction simultaneously when it is moving in the X and Y directions. Referring to the amount of inclination in the Z direction, as shown in FIG. 2, for the respective conditions, the Z feed amounts of the electrode with respect to the X/Y moving amounts thereof are previously stored in the storage means 9, and the stored data are sent directly to the electrode movement control means, so that a constant Z feed amount can be given with respect to the X/Y movements of the electrode regardless of the machining contour shapes.

Figure 4B:
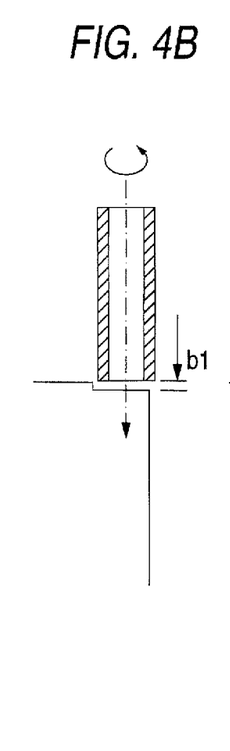

As mentioned above, if a constant Z feed amount is given with respect to the X/Y direction movements of the electrode and the side surface direction amount a of the machining shape dimension is smaller than the depth direction amount b, as shown in FIG. 4B, a constant depth b1 can be machined even when the machining contour pass is long and the electrode wears in such a large amount that cannot be neglected. In this case, electricity is discharged mainly in the bottom surface portion of the electrode and a machining depth b1 per round of the electrode pass always shows a constant value even when the machining contour pass is long (see FIG. 15). Therefore, the working depth b1 per round of the electrode pass with respect to the Z feed amount and electrical conditions/electrode diameters can be calculated by experiments and can also be stored easily as a machining condition table.

Figure 4C:
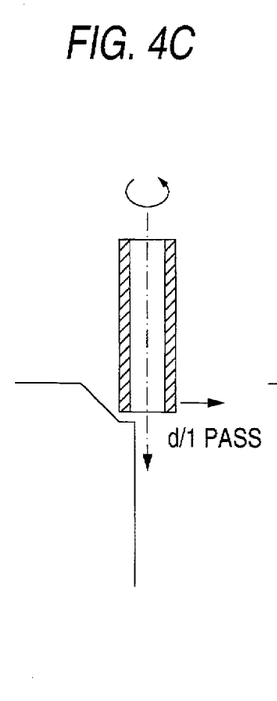
Figure 4D:
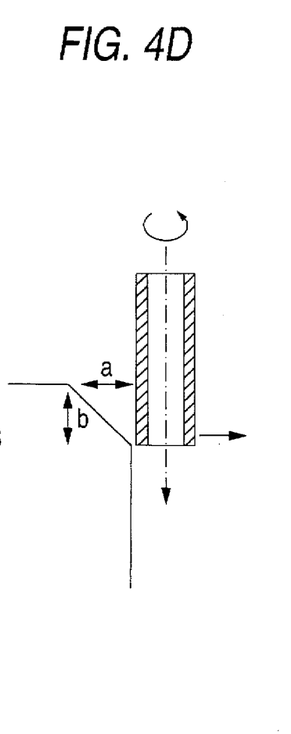

From FIGS. 4B to 4D, the machining is executed in a layer manner each time the number of machining operations of the machining contour pass 13 is increased. However, to carry out the taper machining, it is necessary that, each time a one-layer machining is executed, the offset amount is decreased by d to thereby produce an inclination on the side surface. In the layer machining, when the worn electrode end face portion reaches the depth b, the offset amount becomes zero.

Figure 7:
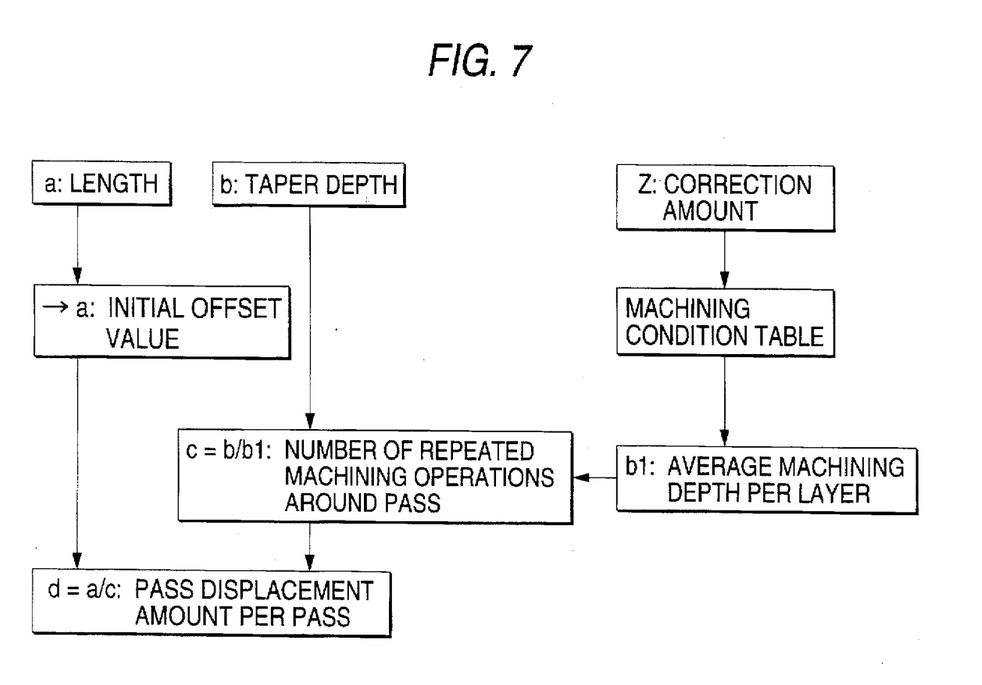
FIG. 7 is a flow chart of calculating means for calculating an offset displacement amount per layer in the electrical discharge machining device according to the embodiment 1 of the invention.

Now, the calculating means used to calculate an offset displacement amount d per layer is shown in FIG. 7. Taper shape dimensions a, b and Z correction amount are given previously. The Z correction amount is referred to by the machining condition table that consists of electrical conditions, electrode diameters and the like. The machining depth b1 per layer can be calculated according to this machining condition table. On the other hand, since the maximum depth of the taper is b, when the machining depth b1 per layer is constant, the number of repetition of the layer-machining operations around the machining shape pass can be decided as c=b/b1.

Figure 8:
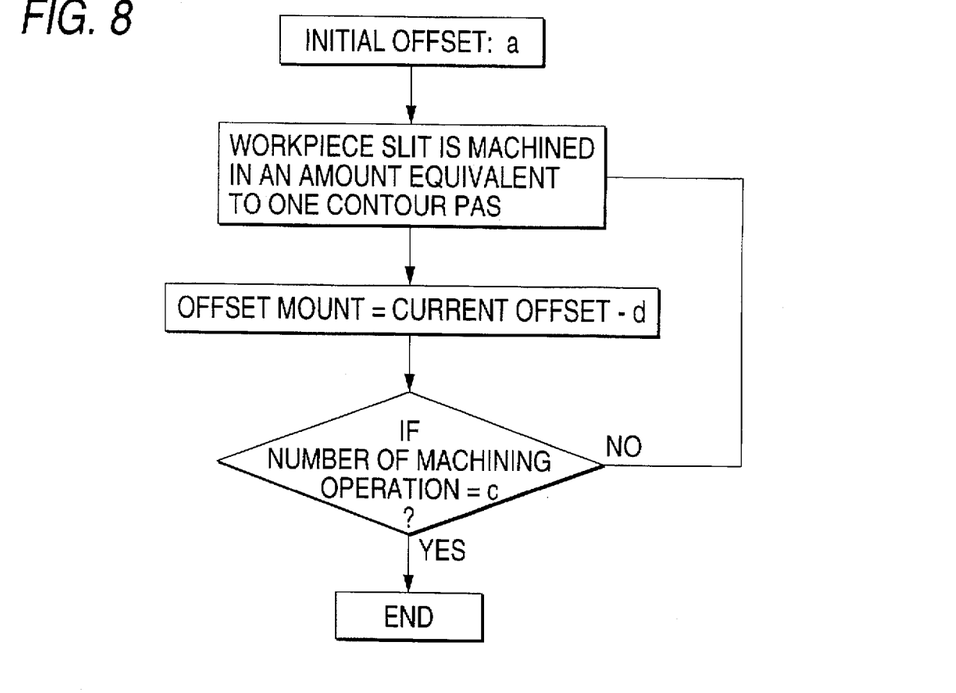
FIG. 8 is a flow chart of an electrical discharge machining method using an offset displacement amount d per machining layer in the electrical discharge machining device according to the embodiment 1 of the invention.

Because the maximum length in the side surface direction of the taper is a, an initial offset value with respect to the basic contour pass 12 is decided as a. From the value of the machining depth b1, the number of machining operations around the machining shape until the machining reaches the depth b can be calculated as c=b/b1. Also, to carry out the side surface taper machining, it is necessary to reduce the offset amount each time the layer-machining operation is executed. The offset displacement amount per layer can be calculated from the machining operation number c, that is, d=a/c. By using the thus calculated offset displacement amount d per machining layer, actual machining is carried out according to a flow chart shown in FIG. 8.

As mentioned above, the electrode having a simple shape is used, the data on the depth to be machined by the constant Z-axis feed amount as well as the correction parameters for taper machining are stored, the number of repetition of machining operations around the electrode pass until the target depth is obtained is calculated from the stored depth data, and the offset displacement amount per electrode pass is calculated from the resultant number of repeated machining operations, so that the offset displacement amount is varied for each electrode pass. Thanks to this, regardless of the wear of the electrode, the side surface taper shape of the workpiece slit can be machined with high precision without using complicated control means when compared with the conventional electrical discharge machining method.

However, as in the present machining, when the side surface taper shape is machined, as the offset value varies, the machining depth b1 per layer varies similarly. Especially, when a is large and the taper angle is large, this varying tendency becomes very great. The reason for this is that the electrode is always rotating and the whole surface of the electrode wears, whereas the area of the machined portion opposed to the electrode decreases gradually, with the result that the electrode wear length decreases. Therefore, a depth B machined when the machining is executed c times is deeper than the set depth b.

In other words, since the term used here "the machining depth b1 per layer" is always varying, it is necessary to correct b1. When b1 is constant, machining at a specified angle is executed in accordance with the above-mentioned offset displacement value d.

Figure 9A:
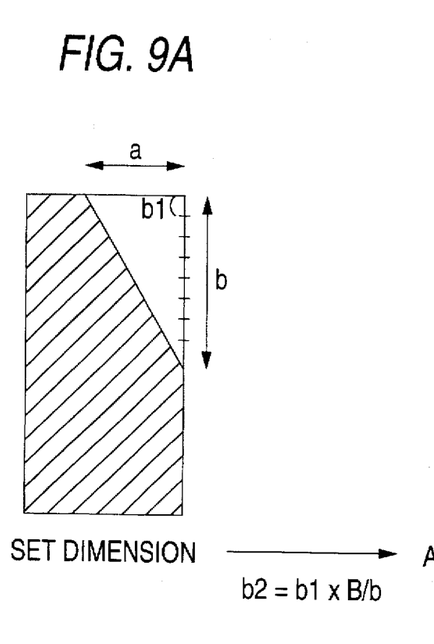
FIGS. 9A and 9B are explanatory views of correction of a machining depth per layer.
Figure 9B:
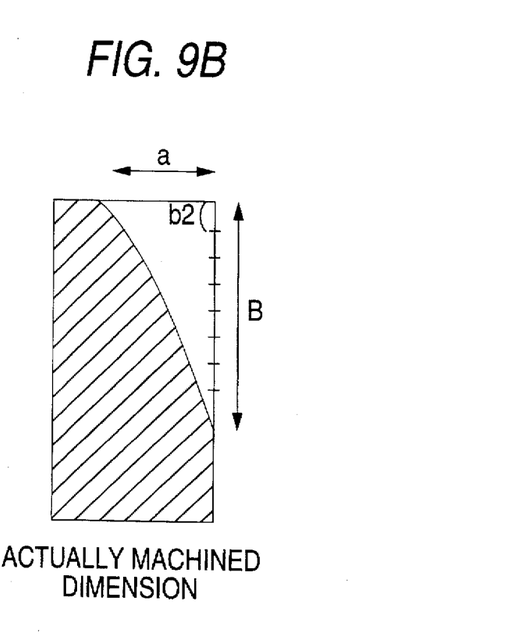

In particular, the side surface of the workpiece slit is machined into the taper dimensions a and b. However, in fact, because b1 varies, the actually machined depth becomes B. For this reason, when the dimension a is constant, a pseudo average machining depth per layer can be obtained in the following equation (see FIG. 9).

$$b2 = b1 \times B/b$$

Also, since the machined depth per layer varies, the machined taper side surface actually provides a taper side surface having such a curve as shown in FIG. 9. However, although such taper side surface has a gentle curve, the dimensions a and b can be corrected accurately in accordance with the data on the above-mentioned pseudo average machined depth value b2.

Figure 10:
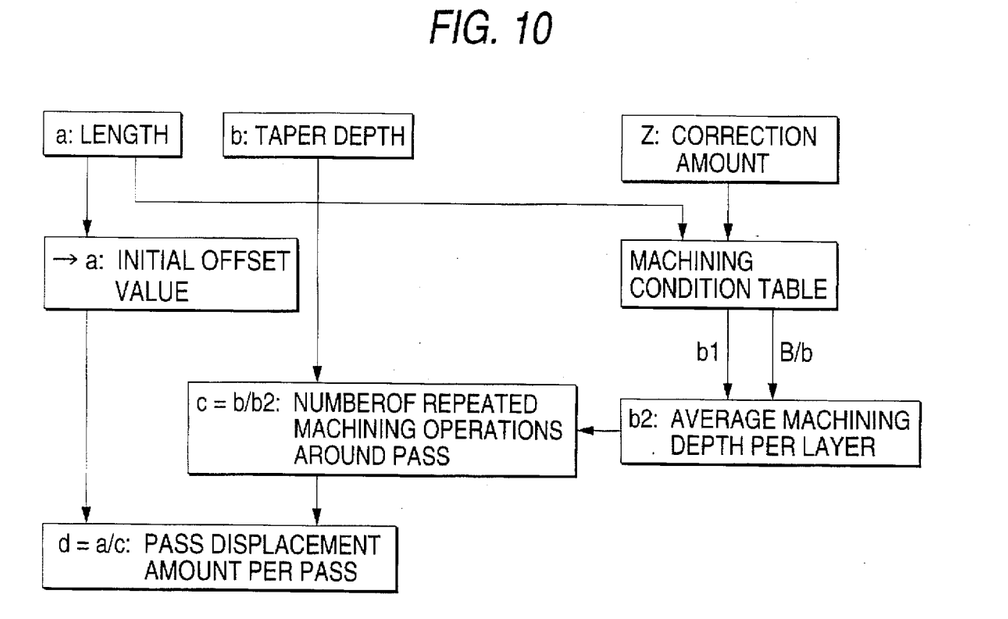
FIG. 10 is a flow chart of another embodiment of the calculating means for calculating an offset displacement amount per layer in the electrical discharge machining device according to the embodiment 1 of the invention.

In accordance with b2 that is calculated from b1 and B/b, the number of machining operations can be found according to an equation, c=b/b2. That is, the previously prepared machining condition table includes not only the data on the machining depth b1 per layer but also the data on the correction amount of b1 per taper dimension a, B/b. To sum up the above, the calculating means for calculating the offset displacement amount d per layer operates in such a manner as shown in FIG. 10.

Thanks to this, when the machining depth per layer varies every electrode pass, the machining depth per layer can be corrected so that the side surface of the workpiece can be machined accurately according to the originally set depth.

Figure 11A:
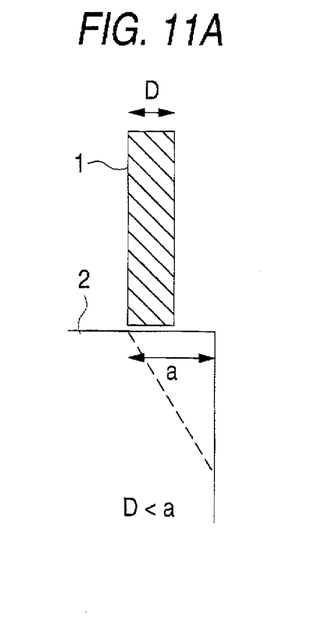
FIGS. 11A and 11B are views of an electrode wear shape obtained when the outside diameter of the electrode is smaller than the taper dimension in the side surface direction of a machined shape.
Figure 11B:
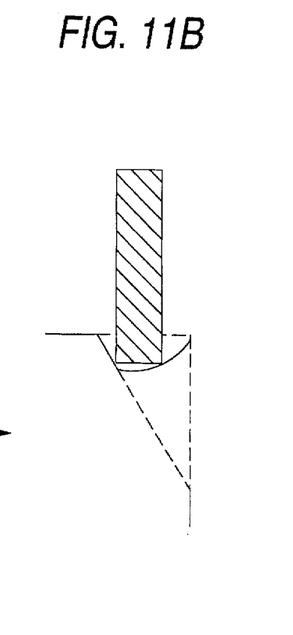

Here, in the present taper machining, if the electrode outside diameter is expressed as D and the side surface direction taper dimension is expressed as a, the electrode used must be an electrode which has a relation, D>a. On the other hand, if D<a, then the side surface of the workpiece is machined in such a shape as shown in FIG. 11, which can raise a fear that there can be left an unmachined portion in the end face of the workpiece slit.

Also, when the offset amount is also caused to vary, not only the electrode wears due to electric discharge in the bottom portion of the electrode, but also electricity is discharged also in the side surface portion of the workpiece slit due to an unmachined or unshaved portion left there and, therefore, the electrode wears on the side surface thereof as well, which fails to obtain an accurate machined shape precision.

Figure 12A:
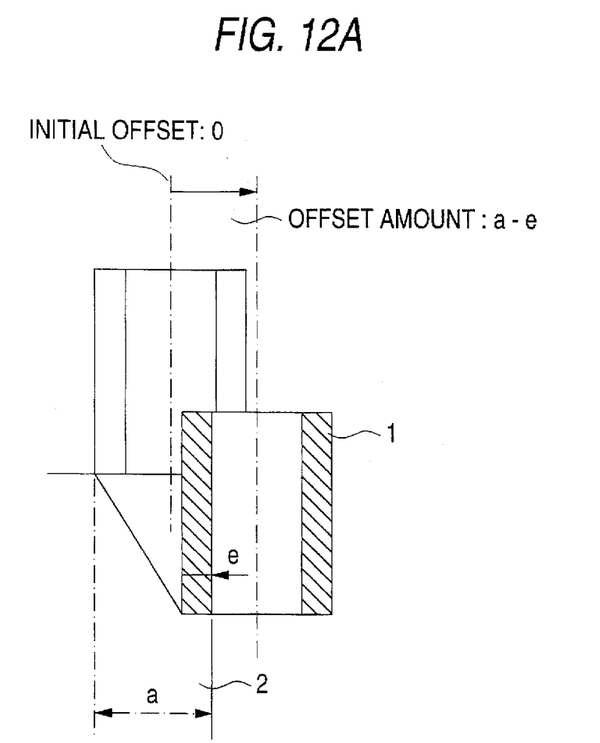
FIGS. 12A and 12B are views of a curved portion existing in the bottom portion of a taper side surface.
Figure 12B:
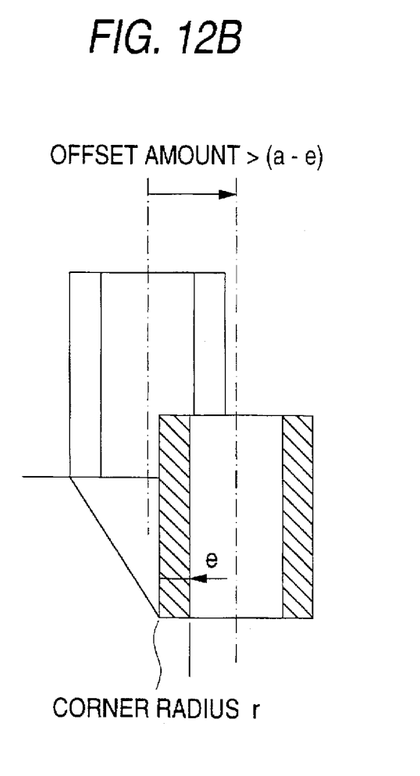

On the other hand, when the taper machining is executed according to the above-mentioned method, it is necessary that the offset amount is caused to vary from 0 to a. In this case, in a machining process in which the offset amount varies from 0 to (a–e), the taper side surface is obtained as a substantially flat surface (see FIG. 12A). Referring to the reason for this, the electrode is rotating and thus, if the area to be machined by the electrode is equivalent to the thickness of the electrode, then the electrode wears on the whole surface thereof, so that the wear of the electrode can be corrected by correcting it only in the Z-axis direction. However, in a machining process in which the offset amount varies from (a–e) to a, as shown in FIG. 12B, the electric discharge is not executed on the entire bottom surface of the electrode, which causes the electrode to wear in such a manner that the edge portion thereof is rounded. As a result of this, in the shape of the finally machined taper portion, there is generated a curved portion having a corner radius r. In view of the above, if the curved corner in the finally machined taper end portion permits up to the corner radius r, then it is necessary to use an electrode with a thickness which satisfies a relation, e→r.

According to the first and fourth inventions, a hollow cylindrical electrode is used, data on the depth that is machined according to a constant Z-axis feed amount is stored, the number of machining operations to be repeatedly executed around the electrode pass until the target depth is obtained can be calculated from the stored depth data, and the offset displacement amount per electrode pass can be calculated from the resultant number of repetitions, so that the offset displacement amount can be made to vary for each electrode pass. Thanks to this, regardless of the wear of the electrode, the side surface taper shape can be machined with high precision without using complicated control means when compared with the conventional electrical discharge machining method.

According to the second and sixth inventions, besides the effects of the above-mentioned first and fourth inventions, since the wear of the side surface portion of the electrode can be minimized, the side surface shape of the workpiece slit can be machined with higher precision.

According to the third and seventh inventions, besides the effects of the above-mentioned first and fourth inventions, since a curved portion produced in the taper side surface bottom portion when the electrode wears can be restricted to a value equal to or less than a permitted value, the side surface shape can be machined with higher precision.

According to the fifth invention, when a machining depth per layer varies every electrode pass, the machining depth per layer can be corrected so that the machining depth can be machined accurately according to the set depth.

What is claimed is:

1. An electrical discharge machining device for applying a pulse voltage between an electrode and a workpiece, and executing a three-dimensional control operation by means of NC control means to thereby machine said workpiece into a desired shape, said electrical discharge machining device comprising:

storage means, after a primary machining operation to form a slit in said workpiece is executed previously as a pre-machining operation, for storing the two-dimensional contour pass of the shape of said workpiece slit formed by said primary machining operation, the dimension of the taper of the side surface of said workpiece slit to be machined, the amounts of feed of said electrode in a given Z direction with respect to the movements of said electrode in the X and Y direction under respective machining conditions, and a machining condition table;

information adding means for adding offset information to the contour pass;

machining operation repetition number calculating means, based on a machining depth per round about an electrode pass which has been previously obtained in accordance with not only data on the depth of the dimension of said slit side surface taper to be machined and the Z-direction feed amount of said electrode but also an electrical condition for machining and the diameter of said electrode, for calculating the number of machining operations to be repeatedly executed on the electrode pass until a target depth is obtained;

offset displacement amount calculating means for calculating an offset displacement amount per round about the electrode pass in accordance with not only the length of the dimension of said slit side surface taper in the side surface direction thereof and but also the number of machining operations to be executed;

electrode position control means, in accordance with an offset position added to the contour pass by said offset information adding means, for controlling the offset displacement amount each time the electrode pass is machined; and, secondary machining means for machining each of the side surfaces of said workpiece slit into a tapered shape while rotating a hollow cylindrical electrode in a Z axis direction by said electrode position control means.

2. The electrical discharge machining device of claim 1, wherein the outside diameter of said hollow cylindrical electrode is equal to or larger than the length of the side surface direction of the side surface taper dimension to be machined.

3. The electrical discharge machining device of claim 1, wherein the thickness of said hollow cylindrical electrode is equal to or smaller than an allowable value of the radius of curvature of a curved portion formed in the bottom portion of said side surface taper.

4. An electrical discharge machining method for applying a pulse voltage between an electrode and a workpiece, and executing a three-dimensional control operation by means of NC control means to thereby machine said workpiece into a desired shape, said electrical discharge machining method comprising the steps of:

executing a primary machining operation on said workpiece to form a slit in said workpiece as a premachining operation;

storing the secondary contour pass of said shape of said slit formed by said primary machining operation, the dimension of the taper to be machined of each of the side surfaces of said workpiece slit, the amounts of feed of said electrode in a given Z direction with respect to the movements of said electrode in the X and Y direction under respective machining conditions, and a machining condition table;

adding offset information to the contour pass;

calculating the number of machining operations to be repeatedly executed on the electrode pass until a target depth is obtained, based on a machining depth per round about an electrode pass which has been previously obtained in accordance with not only data on the depth of the dimension of said slit side surface taper to be machined and the Z-direction feed amounts of said electrode but also an electrical condition for machining and the diameter of said electrode;

calculating an offset displacement amount per round about the electrode pass in accordance with not only the length of the dimension of the slit side surface taper in the side surface direction thereof and but also the number of machining operations to be executed;

controlling the offset displacement amount each time the electrode pass is machined, in accordance with an offset position added to the contour pass by said offset information adding means; and, machining each of the side surfaces of said workpiece slit into a tapered shape while rotating a hollow cylindrical electrode in a Z axis direction.

5. The electrical discharge machining method of claim 4, wherein said step of calculating the number of machining operations to be repeatedly executed on the electrode pass is carried out in accordance with a previously obtained machining depth per round the electrode pass, set depth data based on the slit side surface taper dimension, and previously obtained depth data.

6. The electrical discharge machining method of claim 4, wherein the outside diameter of said hollow cylindrical electrode is equal to or larger than the length of the dimension of said slit side surface taper to be machined in the side surface direction thereof.

7. The electrical discharge machining method of claim 4, the thickness of said hollow cylindrical electrode is equal to or smaller than the allowable value of a radius of curvature of a curved portion to be formed in the bottom portion of said side surface taper.

* * * * *